United States Patent [19]

Bees

[11] Patent Number: 4,647,830
[45] Date of Patent: Mar. 3, 1987

[54] SERIES INVERTER CIRCUIT WITH TIMING RESPONSIVE TO REFLECTIVE CURRENT

[75] Inventor: George L. Bees, Natick, Mass.

[73] Assignee: Candela Corporation, Natick, Mass.

[21] Appl. No.: 444,213

[22] Filed: Nov. 24, 1982

Related U.S. Application Data

[63] Continuation-in-part of Ser. No. 206,289, Nov. 13, 1980, Pat. No. 4,366,570.

[51] Int. Cl.[4] ........................................... H02H 7/122
[52] U.S. Cl. .................................... 320/1; 315/241 R; 363/58
[58] Field of Search ..................... 372/70, 82; 320/1; 363/27, 28, 58, 96; 315/241 R

[56] References Cited

U.S. PATENT DOCUMENTS

| | | | |
|---|---|---|---|
| 3,541,420 | 11/1970 | Rees | 320/1 |
| 3,541,421 | 11/1970 | Buchman | 320/1 |
| 3,852,656 | 12/1974 | Bourbeau | 363/58 |
| 3,860,864 | 1/1975 | Fitz | 320/1 X |
| 4,078,247 | 3/1978 | Albrecht | 363/96 |
| 4,107,771 | 8/1978 | Anderson et al. | 363/58 |
| 4,112,286 | 9/1978 | Alderman et al. | 363/57 |
| 4,129,809 | 12/1978 | Rosa | 363/161 X |
| 4,180,853 | 12/1979 | Scorso, Jr. et al. | 363/96 |
| 4,197,575 | 4/1980 | Young | 363/96 X |
| 4,200,830 | 4/1980 | Oughton et al. | 363/28 |
| 4,204,268 | 5/1980 | Vivirito | 363/96 X |
| 4,506,196 | 3/1985 | Bees | 363/58 |

OTHER PUBLICATIONS

Cronin, 2800 *Watt Series Inverter DC Power Supply*, PCSC, 1971, Record, pp. 117–123.
Schwartz, A., *Series Capacitor Inverter-Converter for Multikilowatt Power Conversion*, NASA Technical Report R-336, Apr. 1970.
RCA Application Note AN-6456, "Characteristics and Applications of RCA Fast-Switching ASCR's", 1976.
RCA Application Note AN-6783, "ASCR's In Welding-Equipment Inverters", 1979.
RCA Application Note AN-6628, "Design and Applications of High-Power Ultrasonic Converters Using ASCR's ", 1978.
Fitz, P. J. and T. H. Robinson, "A Thyristor Switched High Frequency Inverter for Directly Charging a Line Type Modulator", Marconi Research Laboratories, Chelmsford, U.K., pp. 110–117.
"Flashlamp Power Supply System", Model FS-1500, Bulletin 2763 of ILC Technology, 164 Commercial Street, Sunnyvale, Calif. 94087.
"Pulse Charging Power Supply Module", ILC Specification 0159, Apr. 1, 1970.
ILC Technology Circuit Diagram, "Pulse Charging Power Supply", drawing number 50610.
Gayek, H. W., "Power Conditioning for Thermoelectric Generators", IECEC '68 Record, pp. 669–679.

*Primary Examiner*—William H. Beha, Jr.
*Attorney, Agent, or Firm*—Hamilton, Brook, Smith & Reynolds

[57] ABSTRACT

A series inverter, high voltage capacitor charging circuit includes current sensors for sensing the current through each SCR in the circuit. The sensed current is used to vary the gating frequency of the SCRs and to preclude firing of an SCR until the other is in a stable off condition. The gating of each SCR is delayed by an amount of time determined by a control capacitor charging circuit. That charging circuit is inhibited as long as one of the SCRs is conducting and once the load voltage has reached a predetermined level. The time constant of that charging circuit can be changed as the desired level is approached of if insufficient reverse bias is applied to an SCR for quick turn-off of the SCR. Resolution of the system can be increased by a shunt regulator which shorts the output transformer. The circuit can be disabled if the high voltage capacitor does not reach its set level within a given time.

5 Claims, 9 Drawing Figures

SERIES INVERTER CIRCUIT WITH TIMING RESPONSIVE TO REFLECTIVE CURRENT

RELATED APPLICATIONS

This is a continuation-in-part of U.S. patent application Ser. No. 206,289, filed Nov. 13, 1980, now U.S. Pat. No. 4,366,570.

This application is also related to U.S. application Ser. No. 567,618, filed Jan. 3, 1984, now U.S. Pat. No. 4,506,196, which was a continuation of Ser. No. 444,209, filed Nov. 24, 1982, now abandoned, which was a continuation of Ser. No. 206,389, filed Nov. 13, 1980, now U.S. Pat. No. 4,366,570.

DESCRIPTION

1. Technical Field

This application retains its Rule 1.47(b) status.

This invention relates to a control circuit for a series inverter. It has particular application to such converters used for charging high voltage capacitors such as those used to fire lasers.

2. Background

Lasers such as described in the U.S. Pat. No. 3,659,225 to Furumoto et al. use a high power flash to drive the laser. The near instantaneous, high voltage electrical input to such a flash lamp is provided by charging a large capacitor from line voltage to over fifteen kilovolts (kV). To fire the laser, the large capacitor is discharged into the flash lamp.

To provide the high voltage of over fifteen kV from a 110 V line voltage, a step up transformer is conventionally used. A transformer which could operate from line voltage and frequency would be unsuitably large. Thus, past charging supplies have first converted the ac line voltage to a dc voltage. The dc voltage is applied to a series inverter which generates an ac input to the charging transformer at a high frequency in the order of several kilohertz (kHz).

In a preferred series inverter charging circuit, two silicon controlled rectifiers (SCR) are connected across the dc power supply to drive the primary of the charging transformer in a push-pull configuration. To provide maximum efficiency the SCR gating frequency should be very close to but less than the resonant frequency of the charging circuit. In that way, reflective current returned through the primary circuit to the SCRs acts to positively turn one SCR off and also to re-enforce the current drawn through the transformer by the other SCR. Early SCR series inverter circuits used a fixed gating frequency throughout the charging period. This frequency could not be optimum throughout the charging because, in capacitor charging, the load impedance varies from zero to a very high value. With that change in impedance the resonant frequency changes continually, and at best any fixed frequency is a compromise.

Power supplies have been made more efficient by varying the switching frequency to match the load. With feedback responding to the charge level of the charged capacitor, the gating frequency of the SCRs can be made to closely match the resonant frequency of the charging circuit.

A more serious problem with series inverter switching supplies is that, if the gating frequency is not a predetermined amount less than the resonant frequency of the circuit, one SCR may be turned on before the other has stabilized in the off condition. The result is simultaneous conduction by the two SCRs and a short across the dc power supply. Because the switches are operated near the upper limits of their current handling capabilities, such a short circuit is likely to result in destruction of the SCRs. To minimize this problem, some series inverter circuits include circuits which sense this shorted condition and shut the inverter down. In an attempt to avoid such simultaneous conduction, the circuits are designed, based on the LC time constant of the circuit, to delay gating of each SCR for a predetermined time after the expected zero crossing of the ac charging current.

DISCLOSURE OF THE INVENTION

In a series inverter control circuit having eletronic switches connected in a push pull configuration to an LC load, sensors are provided for sensing the condition of each of the electronic switches. Those sensors provide feedback to a control circuit which gates each electronic switch only after the other has settled to a stable off condition.

In the preferred embodiment, the switches are SCR's and the current through the primary of an output transformer is sensed. Each SCR is gated on a predetermined time after the current in the other SCR has dropped to zero. As the SCR conduction time decreases, the gating period also decreases. In that way, the gating frequency closely matches the resonant frequency of the circuit while never equaling or exceeding that frequency.

In a particular embodiment, a control capacitor charging circuit is inhibited for so long as current through either SCR is sensed. Once that current drops to zero, the control capacitor charges to a level which gates the other SCR on. The control capacitor charging time is sufficient to allow each SCR to stabilize in the off condition before the other is turned on. The time constant of the control capacitor charging circuit may be increased as the voltage of the load capacitor approaches a regulated voltage level or if insufficient reverse bias is applied to an SCR for quick turn-off of the SCR. Further charging of the load capacitor is inhibited once its voltage has stabilized at the regulated level.

The preferred embodiment further includes gate assisted turn off of the inverter SCRs so that the inverter can operate at a high frequency. The reverse bias is provided by charging a capacitor associated with a gate control transformer to a first level with current flow through the transformer in a first direction. After gating of the SCR, the terminal of the transformer opposite to the charged capacitor is held at a voltage which is greater than the voltage stored on the capacitor such that the current flows through the transformer in the reverse direction.

In order to increase the resolution of the inverter charging circuit, a shunt regulator short circuits the primary of the transformer when the voltage on the load capacitor reaches its set point.

In the event that the load capacitor fails to reach its set level due to short circuiting of the capacitor or discharge through a load switch, the inverter circuit is cyclically disabled. While the inverter is disabled the current through the load switch drops below the holdover level to allow the switch to achieve a blocking state and enable further charging of the capacitor.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENTS OF THE INVENTION

Figure 1:
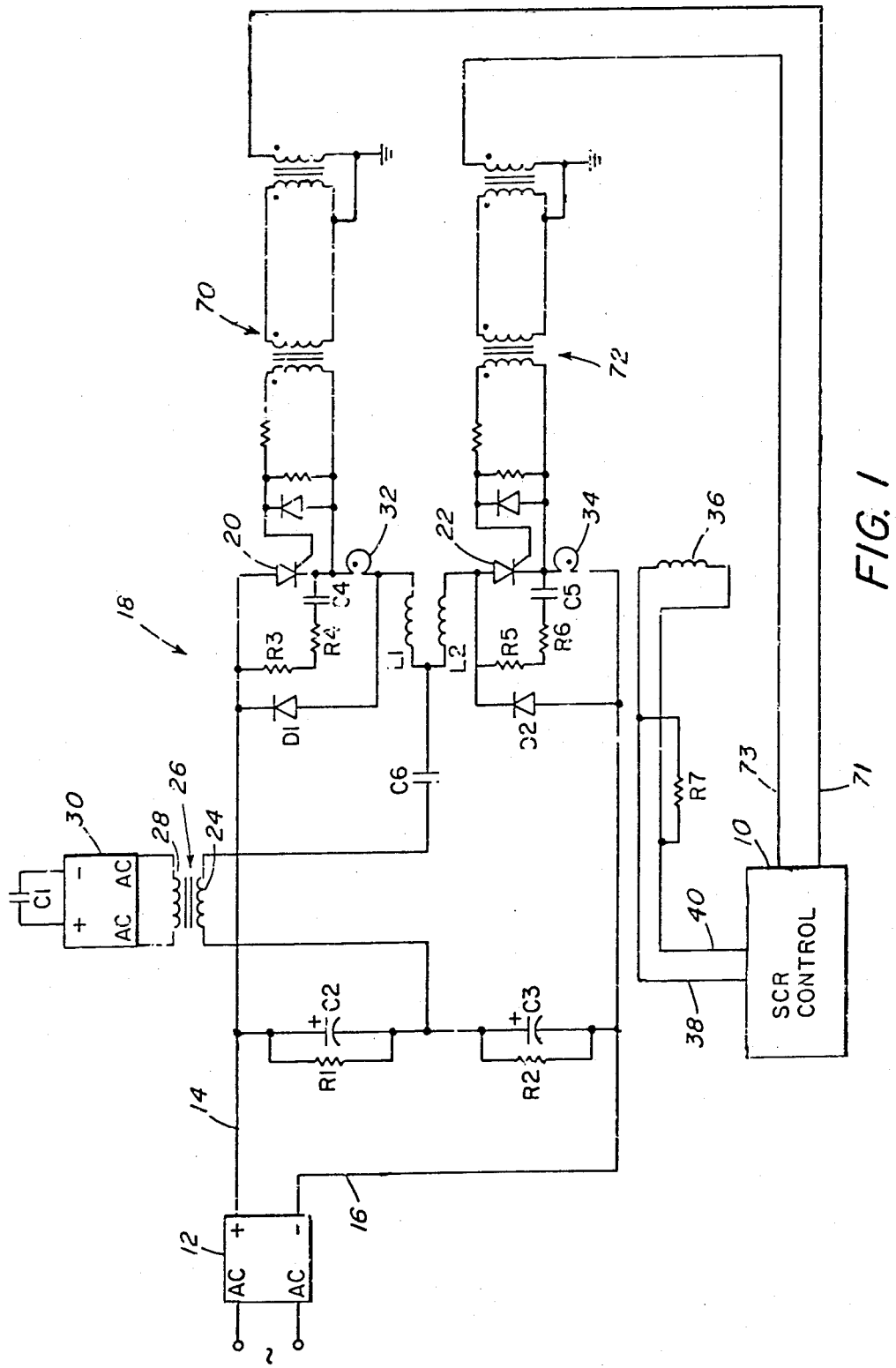
FIG. 1 is an electrical schematic diagram of a series inverter capacitor charging circuit embodying this invention.

FIG. 1 shows a capacitor charging series inverter circuit which is conventional except for the specifics of the SCR control and the feedback from the inverter to that control circuit 10. In this case, the inverter is used to charge a high voltage capacitive load shown simply here as a capacitor C1. That capacitor may, for example, be connected to a laser flash lamp firing circuit. Alternatively, the circuit may be used as a regulated high voltage dc power supply.

Line voltage is rectified by rectifier 12 to provide a dc power supply across lines 14 and 16. The dc supply is filtered by RC filter circuits R1,C2 and R2,C3.

An ac signal is applied to the primary 24 of a charging transformer 26 by alternately gating silicon controlled rectifiers 20 and 22. These SCRs are connected to the primary 24 in a push pull configuration. Diodes D1 and D2 are connected antiparallel to the SCRs to provide a return path for reflective current as will be discussed below.

The series inverter circuit is completed by series inductors L1 and L2 and a series capacitor C6. These LC devices, in combination with the effective reactance seen at the primary of the transformer 26 determine the LC time constant of the circuit.

The very high frequency ac signal generated by the series inverter is stepped up to a high voltage such as 15–25 kV on the secondary 28 of the transformer. That high voltage ac signal is converted to a dc charging current by the rectifier 30. The capacitor C1 is charged a small amount, such as about 0.1 Joule (J) with each cycle of the inverter circuit. Operating at switching frequencies of about 6 KHZ to about 8 KHZ, the circuit is able to charge the capacitor C1 at a charging rate of over 1,000 J/second from 10 kV to 25 kV.

Figure 2:
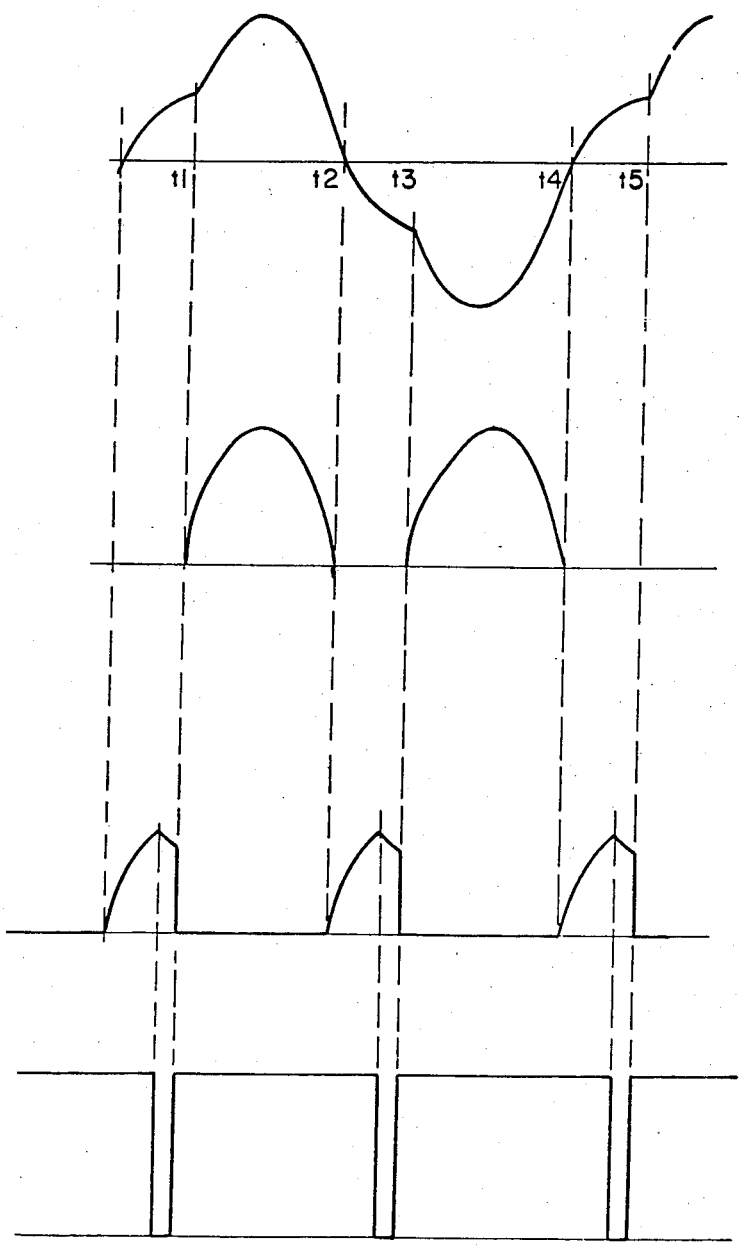
FIG. 2 is a timing chart for certain electrical signals in the series inverter circuit and its control.

The preferred operation of any SCR controlled series inverter circuit can be best understood with reference to FIG. 2A. If the SCR 20 is switched on at time t1, current flows through that SCR, series inductor L1 and series capacitor C6 and through the transformer primary 24. Because the dc voltage is applied to an LC circuit, the current flow through the SCR will be approximately sinusoidal. Thus, the current through the SCR 20 and the transformer winding 24 drops to zero at the resonant frequency of the circuit. From the zero crossing time t2, reflective current flows back through the transformer winding 24 and the diode D1. At time t3, the SCR 22 is gated on to pull current through the transformer winding. The reflective current through diode D1 and the current drawn through SCR 22 re-enforce each other. This current is also sinusoidal and thus goes to zero at time t4 at which time the SCR 22 turns off. Reflective current continues through diode D2 until the SCR 20 is turned on at time t5, the beginning of another cycle.

It is important that each SCR not be gated on for some predetermined time after the other has turned off. If an SCR is not allowed to stabilize in the off condition, the SCR which next turns on can draw current through the first to switch it back on and create a short circuit between lines 14 and 16. The resultant high current would likely burn out the SCRs.

On the other hand, the turning on of the SCR should not be delayed any longer than necessary because the circuit operates most efficiently when the reflective current and SCR current re-enforce each other. Thus, each SCR should be gated at a frequency which is as close as possible to the resonant frequency of the circuit while still precluding the possibility of a commutation failure. The control of the SCRs is further complicated by the fact that the resonant frequency of the circuit increases as the load capacitor is charged. Thus, as the time period t1–t2 decreases with charging of the capacitor, the time t1–t3 must also decrease. Otherwise, the time t2–t3 would increase and the efficiency of the circuit would be reduced.

In accordance with this invention, the cathode current of each of the SCR's is sensed and fed back to the SCR control circuit 10. That feedback signal is used to preclude commutation failure and to vary the gating frequency of the SCRs. Specifically, in the embodiment of FIGS. 1, 3 and 4 the cathode currents are sensed by a three winding current transformer including primaries 32 and 34 and a current sensing secondary coil 36. The coil 36 is connected in parallel with a resistor R7. The current on winding 36 is positive if SCR 20 is conducting through the winding 32, and the current is negative if SCR 22 is conducting through winding 34.

Figure 3:
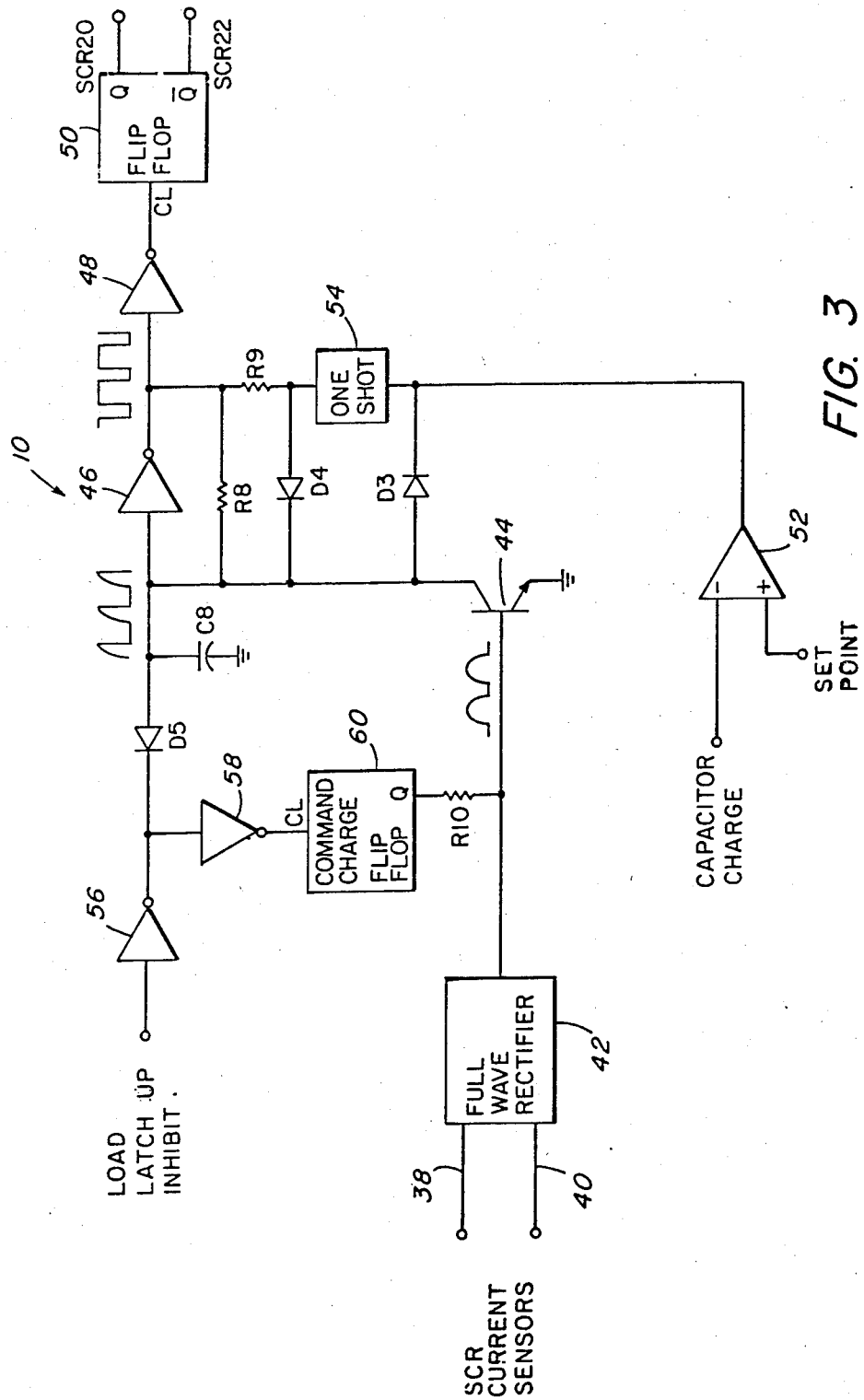
FIG. 3 is a simplified electrical schematic of the SCR control circuit of FIG. 1.

A simplified schematic of the SCR control circuit 10 is shown in FIG. 3. The sensing current on lines 38 and 40 from the winding 36 are applied through a full wave rectifier 42 to produce the sensed current signal of FIG. 2B. That signal drives the inhibit transistor 44. It is important that the current through the SCRs be distinguished from that through the diodes; otherwise the diode current would also cause transistor 44 to conduct. It is for that reason that the current sensing windings are placed between the SCR cathodes and the diode connections.

During the short periods in which neither SCR is conducting, and thus in which transistor 44 is turned off, a control capacitor C8 is charged as shown in FIG. 2C. When the capacitor C8 has charged to a level sufficient to trigger an inverting Schmitt trigger 46, a gating clock pulse (FIG. 2D) is sent through an inverter 48 to an SCR control flip flop 50. The gating of the SCRs 20 and 22 are controlled by the respective Q and $\bar{Q}$ outputs of that flip flop. Thus, triggering of the Schmitt trigger 46 after charging of the capacitor C8 initiates gating of whichever SCR was in the off condition during the previous half cycle. The charging time of the capacitor C8 is determined by the parallel resistors R8 and R9 connected to the output of the Schmitt trigger 46. Thus, the resistors R8 and R9 and the capacitor C8 are selected to provide a control capacitor charging time matching the time required for an SCR to stabilize after turning off.

As each SCR is turned on, a signal is applied through the current transformer in the full wave rectifier 42 to turn transistor 44 on. This discharges the capacitor C8 and inhibits further clocking of the flip flop 50 until the particular SCR turns off.

It should be recognized that the time between SCR gating pulses is determined directly by the on time of the SCRs. A short time interval required for each SCR to stabilize is added to that on time. Thus, as the on time decreases with charging of the load capacitor C1, the time between gating pulses also decreases. A single feedback circuit has both precluded simultaneous conducting by the SCRs and provided a varying frequency, load dependent, gate driving oscillator.

To regulate the voltage to which the load capacitor C1 is charged, the charge on that capacitor is detected through a voltage divider (not shown) to provide an input signal at the inverting input of a comparator 52. That input is compared to a set point voltage, and the output of the comparator goes low when the charge voltage matches the set point. With the output of comparator 52 low, the control capacitor C8 is discharged through diode D3. Further charging of the capacitor is inhibited for so long as the load charge is at the set point.

Noise can be expected to switch the comparator output before the charged voltage actually stabilizes at the desired regulated voltage. In order to slow the SCR gating and thus reduce the charging rate and noise, a one shot 54 is connected to increase the time constant of the control capacitor charging circuit when the comparator 52 detects the desired level, even if only noise is detected. When the noise is detected, the output of the one shot 54 goes low to turn the diode D4 off and disconnect resistor R9 from the control capacitor charging circuit. The one shot assures that this increased time constant prevails for a period of time even after the noise has subsided and the capacitor C8 is allowed to recharge.

As noted, once the voltage across the load capacitor C1 has stabilized at a level determined by the set point input to comparator 52, the charging circuit is inhibited and the regulated voltage is held on the capacitor C1. If that capacitor is in a laser firing circuit it may be discharged almost instantaneously through a power switch to the laser flash lamp. Once the capacitor has discharged, it is important that it not be recharged until the power switch is stabilized in the off condition. To prevent immediate recharging, a load latch up inhibit input is provided in the circuit of FIG. 3. When the load capacitor is discharged, a signal can be provided to the input of inverter 56 which discharges the capacitor C8.

That input also clocks a command charge flip flop 60 through another inverter 58. The output of the flip flop then goes high to turn on the transistor 44 until the flip flop is again clocked. Thus, the gating of the SCRs 20 and 22 is inhibited until a second signal is applied to the inverter 56 to switch the Q output of flip flop 60 low.

Figure 4:
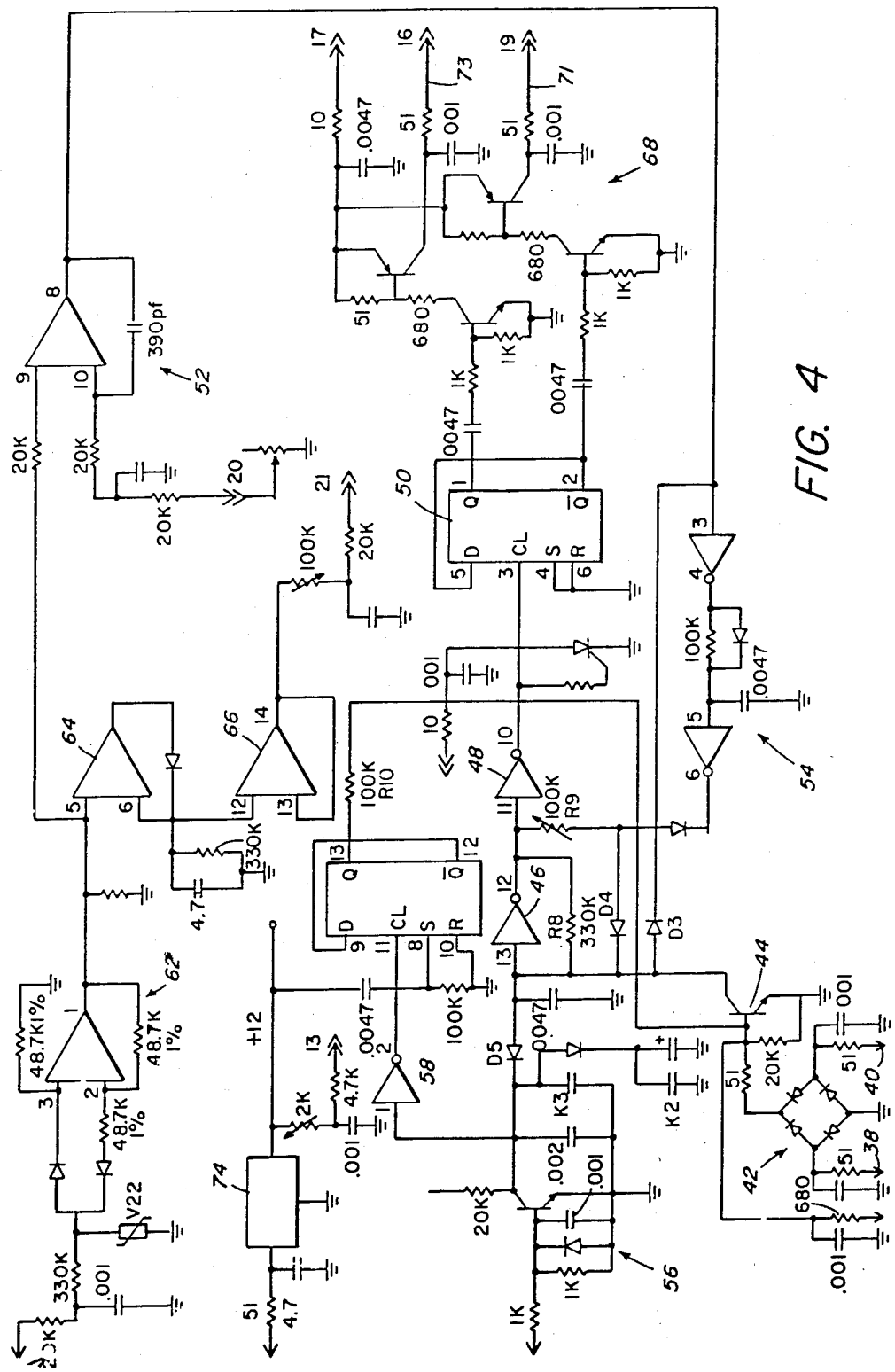
FIG. 4 is a detailed electrical schematic of the control circuit of FIG. 3.

A detailed schematic of the control circuit of FIG. 3 is shown in FIG. 4. Circuitry not indicated in FIG. 3 includes the full wave recitifier 62 which receives the voltage divided signal from the load capacitor and applies the resultant signal to the comparator 52. That signal is also input to a peak detector 64 which drives an external meter through a buffer amplifier 66. A voltage regulator 74 provides a 12 volt reference. Further, amplifiers 68 are provided at the output of the flip flop 50 to drive the SCR gates. As shown in FIG. 1, the gates are also driven through isolation transformer circuits 70 and 72.

With the high voltage section of a laser firing circuit, including the charging transformer 26 immersed in oil for heat dissipation, capacitor charging using the described circuit can be performed at very high repetition rates approaching that of the oscillator.

An alternative embodiment of this invention is shown in FIGS. 5 through 8. In this circuit, the current through the SCRs 20 and 22 is sensed by a common current sensor in the load circuit. The circuit offers several improvements including means for delaying turn on of an SCR if insufficient reverse bias is applied to the other SCR, gate assisted turn off of each SCR for higher frequency operation, a shunt regulator which allows for a higher resolution of the voltage to which the load capacitor is charged and means for disabling the inverter when the load capacitor fails to reach its proper charge after an extended operation of the circuit.

Elements of the embodiment of FIGS. 5–8 which are common to the embodiment of FIGS. 1 through 4 are indicated by like reference numerals.

An ac signal is applied through a rectifier 12 to provide a dc power supply across lines 14 and 16. The dc supply is filtered by RC filter circuits R1, C2 and R2, C3.

SCRs 20 and 22 generate an ac signal which is applied through capacitor C6 to the primary 24 of a transformer 26. That signal is stepped up to a high voltage on the secondary 28 of the transformer 26 and applied through a rectifier 30 to the load capacitor C1. With each cycle of the inverter circuit, the capacitor is charged an incremental amount.

As before, the series inverter circuit includes inductors L1 and L2, and it includes diodes D1 and D2 connected antiparallel to the SCRs.

In this embodiment, a single current sensor 100 having a primary 104 and secondary 102 replace the three winding current transformer 32, 34, 36 of FIG. 1. This current sensing transformer 100 senses the signal E of FIG. 7. It should be noted that signal E indicates that each SCR is switched on only after the reflective current has settled to zero. This simplifies the discussion of the circuitry which follows. However, it will be recognized that each SCR might be switched on more quickly to provide a signal as shown in FIG. 2A.

Figure 6:
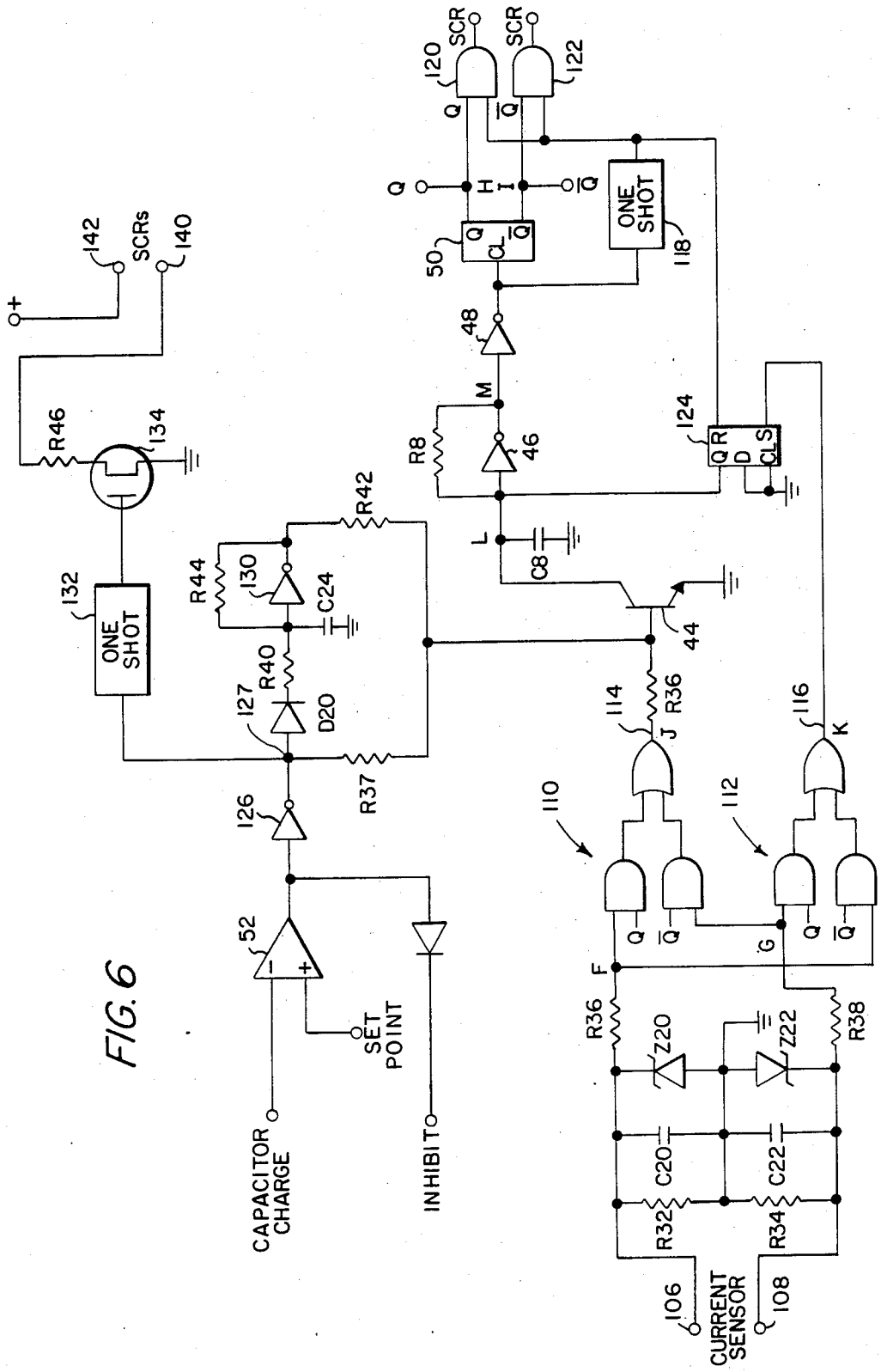
FIG. 6 is an electrical schematic diagram of the SCR control circuit for use with the embodiment of FIG. 5.

The terminals 106 and 108 of the transformer 100 are connected to the SCR control circuit of FIG. 6. The forward current of signal E is filtered by the RC circuit R32, C20 and clipped by zener diode Z20. Reverse current is filtered by the RC circuit R32, C22 and clipped by zener diode Z22. Those signals are applied through resistors R36 and R38 to provide the resultant signals F and G of FIG. 7 to the inputs of logic circuits 110 and 112.

The Q and Q- inputs to the logic circuits 110 and 112 are taken from the flip flop 50 which selects the SCR which is to be gated as in the embodiment of FIG. 3. The Q and Q- signals are shown at H and I of FIG. 7. Depending on the state of the Q and Q- signals, the forward current signal F is applied to line 114 and the reverse current signal G is applied to line 116 or, alternatively, the reverse current signal G is applied to line 114 and the forward current signal F is applied to line 116.

Figure 7:
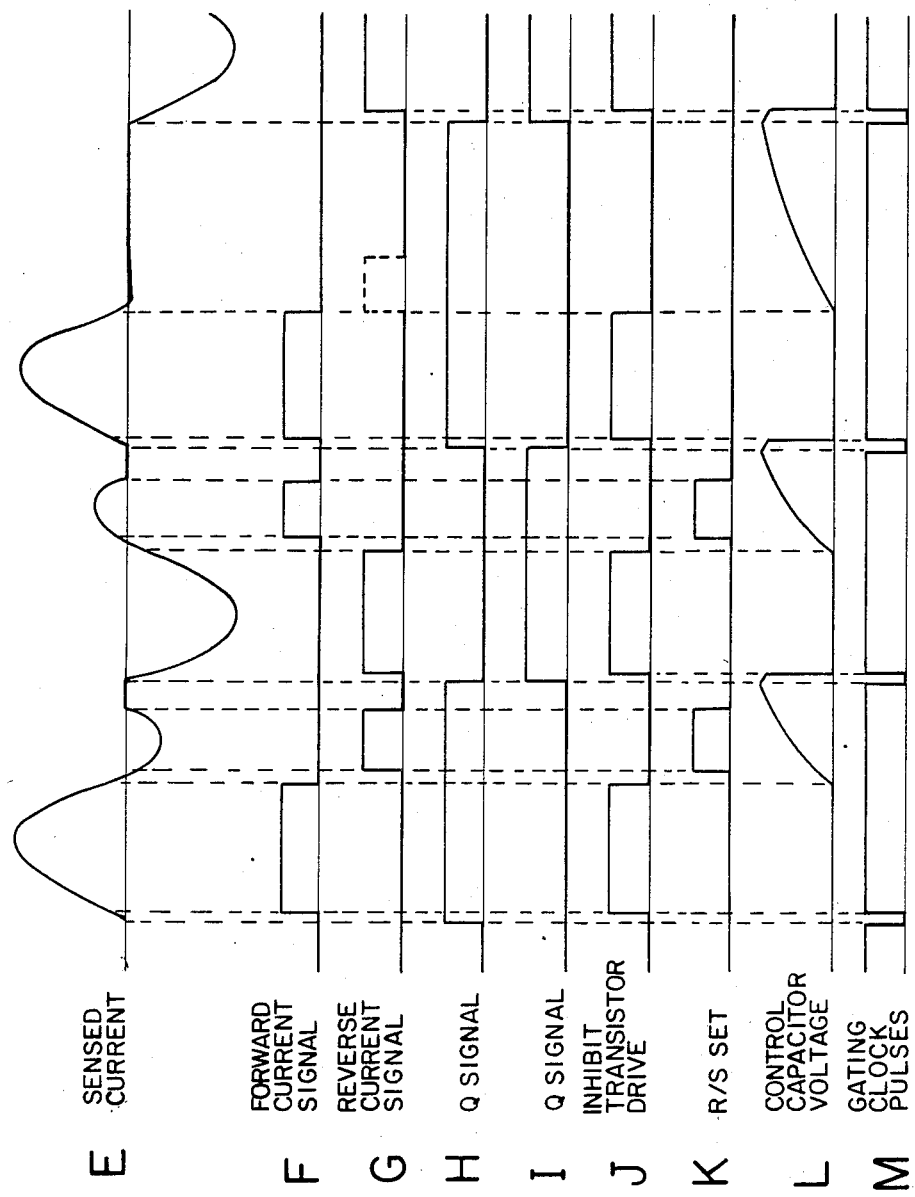
FIG. 7 is a timing chart for certain electrical signals in the series inverter circuit of FIG. 5 and its control of FIG. 6.

The signals applied to lines 114 and 116 are shown at J and K of FIG. 7. It can be seen that the signal on line J is an indication of whether either of the SCRs 20 and 22 is conducting. For reasons to be discussed below, the signal K on line 116 indicates whether reflective current is flowing back through the transformer winding 24 and either of the diodes D1, D2.

As before, neither SCR is to be gated on while the other is conducting. Thus, the signal J, which indicates whether either SCR is conducting, is applied through a resistor R36 to the inhibit transistor 44 which corresponds to the transistor 44 of FIG. 3. When signal J indicates that either SCR is conducting, transistor 44 is turned on and capacitor C8 discharges. Once the current through an SCR nears its zero crossing, the signal on line 114 goes low and transistor 44 turns off. This allows capacitor C8 to be charged through the resistor R8 connected across the Schmitt trigger inverter 48 to form an oscillator. The voltage on the control capacitor C8 is illustrated at L in FIG. 7.

Once the capacitor C8 is charged to a level sufficient to trigger the inverter 46, the gating clock pulse (FIG. 7M) is sent through an inverter 48 to the SCR control flip flop 50. As before, the Q and Q- outputs of the flip flop 50 determine which SCR is to be gated on.

The time during which a forward bias is to be applied to the gate of each SCR is determined by a one shot multivibrator 118 whose output is applied to AND gates 120 and 122 along with the Q and Q-signals.

As noted above, signals which indicate there is a reflective current passing through the diodes D1 and D2 are provided at K on line 116. That reflective current assists rapid turn off of each SCR. However, under certain conditions, the reflective current may be minimal. Under those conditions, longer time is required for the SCR to turn off. For that reason, a longer period of time should be allowed between the time the current stops flowing through an SCR and the time that the other SCR is turned on. Otherwise, turning on of the second SCR might result in the simultaneous conduction through the first SCR which had not yet stabilized to an off condition.

To avoid that dangerous condition of simultaneous conduction of the SCRs, the present circuit allows for rapid charging of the capacitor C8 when reflective current is sensed but provides for a slower charging of that capacitor where no reflective current is sensed. Accordingly, the signal 116 is applied to the set input of the flip flop 124. Where a reflective current is sensed, as in the first two half cycles of signal E in FIG. 7, the flip flop 124 is set. This results in a high Q output from flip flop 124 which assists in charging of the capacitor C8.

If, on the other hand, little or no reflective current is present, as in the third half-cycle of signal E in FIG. 7, the reverse current signal shown in broken lines in FIG. 7G is not obtained and a set signal is not applied along line 116 to the flip flop 124. It can be noted that the flip flop will have been reset by the output of the one shot 118 in the previous cycle. Thus, the signal on the Q output of flip flop 124 remains low and the capacitor C8 is charged only through the resistor R8. A longer time is then required for the capacitor C8 to charge to a level which triggers the inverter 46 as indicated at FIG. 7L. This results in a delay of the gating clock pulse M which triggers the gating of the next SCR.

As in the previous embodiment, the voltage level of the load capacitor C1 is sensed through a voltage divider circuit (not shown) and compared to a set point reference by a comparator 52. In this case, when the voltage on the load capacitor reaches the level determined by the set point reference, the output of the comparator 52 goes low to provide a high output from an inverter 126. Like a high signal on line 114, the high signal at the output of inverter 126 is applied through a resistor R37 to turn the inhibit transistor 44 on. This discharges the capacitor C8 and inhibits further gating of the SCRs until the voltage level on the load capacitor C1 drops below a level determined by the set point input to comparator 52 and the comparator's dc hysteresis.

The circuit of FIG. 6 also includes means for disabling the inverter circuit if the load capacitor fails to charge in a reasonable time. To that end, a Schmitt trigger circuit 128 is provided. If the circuit 128 sees a high voltage at point 127, which indicates that the load capacitor is sufficiently charged, the capacitor C24 is quickly charged through the diode D20 and resistor R40. This causes the output of inverter 130 to remain low. The output of the inverter 130 is applied to the inhibit transistor 44 through a resistor R42.

The resistors R36, R37 and R42 serve as a logic OR-gate. Thus, if the voltage applied to any of those resistors is high, transistor 44 turns on; otherwise, the transistor 44 remains off.

Once the load capacitor has discharged, the signal on line 127 goes low to return control of the transistor 44 to the logic circuit 110. The diode D20 blocks discharge of the capacitor C24 through resistor R40 so the output of inverter 130 remains low. A relatively large resistor R44 is connected across the inverter 130. The capacitor C24 is able to discharge through that resistor over a long time period. If, after that long time required for the capacitor C24 to discharge, the capacitor has not been recharged quickly through diode D20 and resistor R40, the output of the inverter 130 finally goes high to turn the transistor 44 on and disable the inverter circuit. Thereafter, the Schmitt trigger 128 oscillates with the capacitor C24 now being charged and discharged through the resistor R44 until the signal at 127 goes high with a full capacitor charge. When the output is triggered low, after charging of the capacitor, the transistor 44 is again returned to the control of the logic circuit 110.

In effect, the Schmitt trigger 128 reduces the power applied through the inverter by enabling the inverter throughout a duty cycle determined by the Schmitt trigger. This prevents burning out of any circuit elements if the load capacitor C1 is shorted out. It does allow some charging to continue, however, so that the load capacitor will be charged if the short is removed. Once the short has been removed and the capacitor C1 has been slowly charged at the duty cycle determined by the Schmitt trigger 128, the signal on line 127 finally goes high to drive the output of the Schmitt trigger low. Thereafter, the Schmitt trigger has no effect on the circuit unless the charge in the capacitor C1 is removed for the extended length of time.

Figure 9:
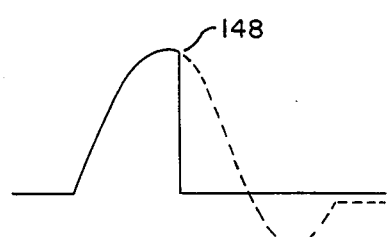
FIG. 9 illustrates the current flow through the output transformer with shunt regulation.
Figure 8:
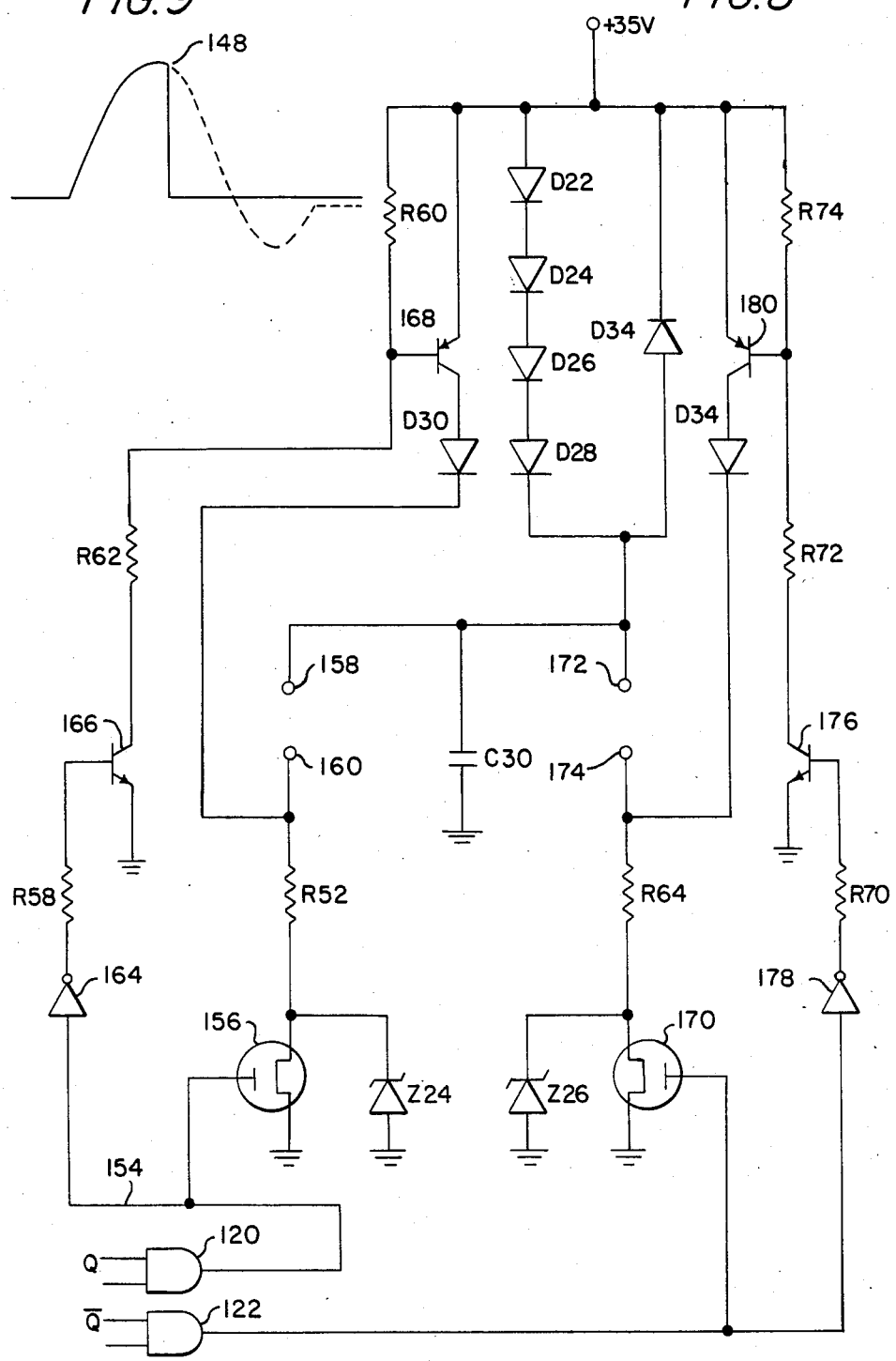
FIG. 8 is an electrical schematic diagram of an SCR gating circuit for use with the circuits of FIGS. 5 and 6 to provide gate assisted turn off of the SCRs.

To increase the resolution of the output of the capacitor charging circuit, a shunt regulator is provided. Accordingly, when the voltage on capacitor C1 reaches the level determined by the set point applied to comparator 52, a one shot multivibrator 132 is triggered and a field effect transistor 134 is turned on. That transistor draws current through the resistor R46 and the primaries of control transformers 136 and 138 (FIG. 5) through terminals 140 and 142. The outputs from those transformers 136 and 138 are applied across resistors R48 and R50 to the gates of SCRs 144 and 146. The SCRs effectively short circuit the primary 24 of the output transformer 26. Thus, if the load capacitor reaches its set voltage level during a cycle of the inverter current, as when the current through the winding 24 is at point 148 of FIG. 9, the current through the primary is immediately shunted so that no further power is applied through the transformer to charge the load capacitor. The one shot 132 need not be held on beyond one cycle of inverter current because the transistor 44 will also be turned on to inhibit further gating of the SCRs 20 and 22.

It should be noted that, because the shunt regulator is connected to the primary of the output transformer, the regulator is nondissipative. The power is returned to the filter capacitor C2 and C3 and is not dissipated in the output circuit.

As a further improvement in this circuit, to increase the speed of the SCRs 20 and 22 gate assisted turn off is utilized. To that end, the outputs of the AND gates 120 and 122 from the control circuit of FIG. 6 are applied to the gate control transformers 150 and 152 Of FIG. 5 through the circuit of FIG. 8. To understand operation of that circuit, consider the gating of SCR 22 by a pulse applied through the AND gate 120. With the signal on line 154 high, the FET 156 turns on to draw current through resistor R52 and the terminals 158 and 160 connected to the primary of the control transformer 152. With the current thus drawn through the primary of the transformer 152, a high voltage is applied to line 162 which gates the SCR 122 on through resistor R54.

While FET 156 draws current through the transformer 152, the diodes D22, D24, D26 and D28 provide a 2.4 volt voltage drop from the 35 volt voltage reference. Thus, while the SCR 22 is gated on, the capacitor C30 charges to a 32.6 volt level.

After the time determined by the one shot 118 in the control circuit of FIG. 6, the output of AND gate 120 goes low. The FET 156 then turns off. That low signal is applied through an inverter 164 and resistor R58 to turn a transistor 156 on. That transistor draws current through the resistors R60 and R62 to turn transistor 168 on. Current conducted through the transistor 168 and diode D30 results in a 0.9 volt drop from the 35 volt reference to provide a 34.1 voltage level at terminal 160. That voltage level is higher than the 32.6 volt level retained by the capacitor C30, so current now conducts from terminal 160 through the primary of transformer 152 to terminal 158. As a result, current is drawn through the diode D32 (FIG. 5) to provide a reverse bias to the gate of SCR 22. With that reverse bias, the SCR 22 stabilizes in an off condition more quickly once its forward current has dropped to zero. The capacitor C30 is sufficiently slow to charge that it does not rise to the 34.1 volt level of terminal 160 until after the SCR 122 has turned off.

At some time after the SCR 22 has turned off, the output of AND gate 122 goes high to turn FET 170 on to draw current through resistor R64 and the primary of control transformer 150. This gates the SCR 20 on through resistor R66. As in gating of the SCR 22, after termination of the gate signal applied from AND gate 122, the FET 170 turns off and a transistor 176 is turned on through an inverter 178 and a resistor R70. That transistor 176 draws current through resistors R72 and R74 to cause transistor 180 to drive current through diode D34 and the primary of transformer 150 to capacitor C30. This causes reverse biasing of the gate of SCR 20 through diode D36.

Figure 5:
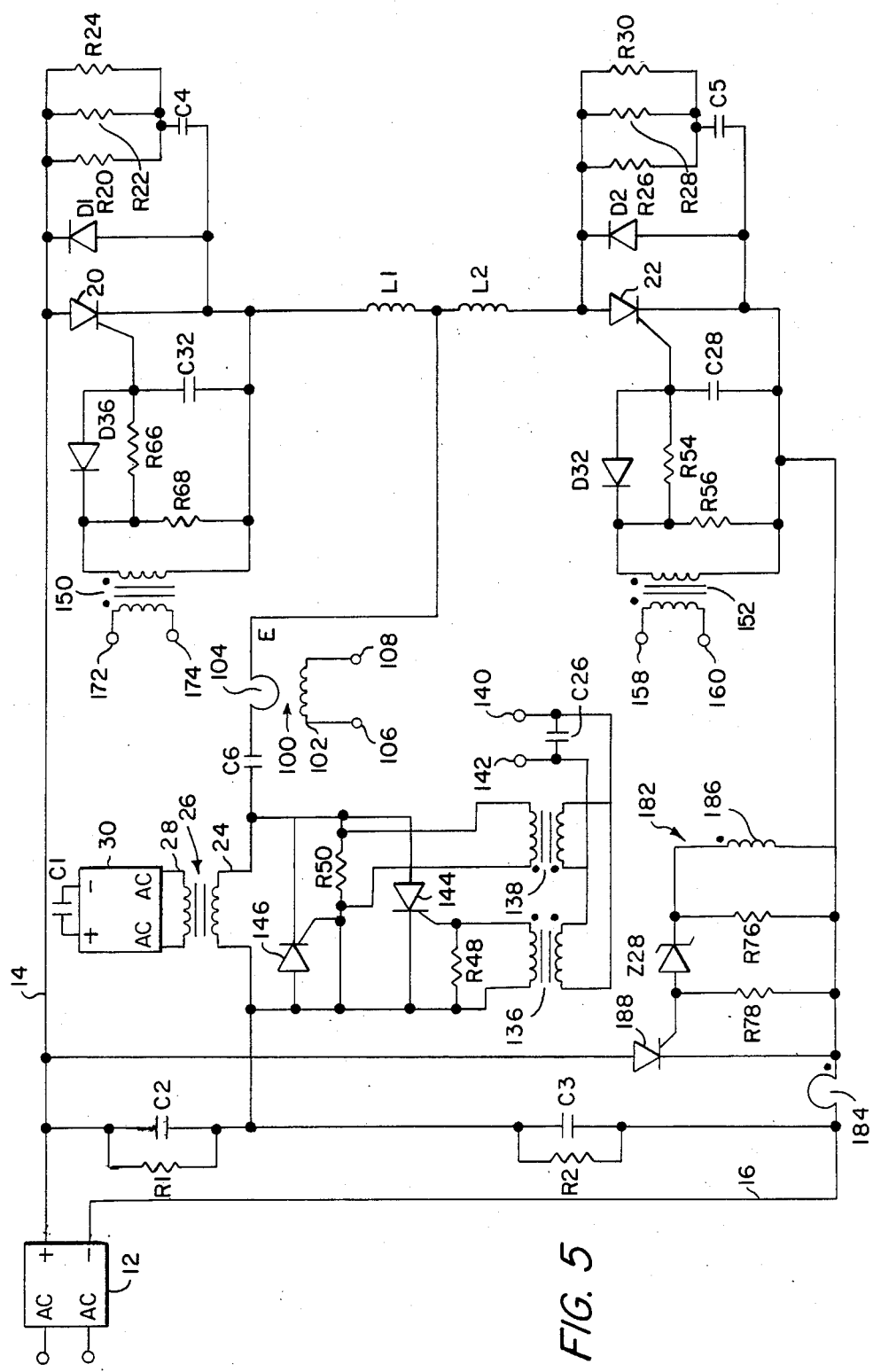
FIG. 5 is an electrical schematic diagram of an alternative embodiment of a series inverter capacitor charging circuit similar to that shown in FIG. 1.

Notwithstanding the above-described control of SCR gating, under certain unusual conditions, the SCRs 20 and 22 may still conduct simultaneously. To prevent burnout of the inverter circuit in that event, a crowbar circuit 182 is provided (FIG. 5). The current flow to the line 16 is sensed by a sensing transformer comprising a primary 184 and a secondary 186. In the event that both SCRs conduct simultaneously a very high current will be sensed by that transformer. A high voltage is thus applied across the resistor R76. That high voltage results in reverse current flow through the zener diode Z28 to gate a shunt SCR 188. Whereas the SCRs 20 and 22 are selected for speed, the SCR 188 is selected for its current handling capability. It short circuits the series inverter to avoid burnout of the inverter.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A series inverter circuit comprising electronic switches connected in a push pull configuration, with a diode connected antiparallel to each switch, and a common load circuit, the load current causing reflective current through each diode following current through a respective switch, the circuit comprising:
    means for sensing at least one electric parameter of the inverter circuit indicative of reflective current;
    gate control means responsive to the at least one sensed electric parameter for directly gating each electronic switch "on" a predetermined time after current flow through the other switch has dropped to about zero, that predetermined time being greater than the time required for the other switch to settle to a stable off condition, the gate control means including means for increasing said predetermined time when the sensed parameter indicates insufficient reflective current for rapid turn off of a switch such that the switch requires greated time to settle to a stable off condition.

2. A circuit as claimed in claim 1 wherein a sensed parameter is the amplitude of reflective current resulting from the forward current through the switch.

3. A circuit as claimed in claim 1 wherein the electronic switches are silicon controlled rectifiers.

4. A circuit as claimed in claim 1 wherein the load circuit comprises a laser firing load capacitor.

5. A circuit as claimed in claim 1 including means for disabling the gate control means when the voltage level of a load capacitor reaches a predetermined level.

* * * * *

UNITED STATES PATENT AND TRADEMARK OFFICE
CERTIFICATE OF CORRECTION

PATENT NO. : 4,647,830

DATED : Mar. 3, 1987

INVENTOR(S) : George L. Bees

It is certified that error appears in the above-identified patent and that said Letters Patent is hereby corrected as shown below:

ON TITLE PAGE:
The term of this patent subsequent to December 28, 1999, has been disclaimed.

Signed and Sealed this

Tenth Day of March, 1992

*Attest:*

HARRY F. MANBECK, JR.

*Attesting Officer*     *Commissioner of Patents and Trademarks*